United States Patent
Xu et al.

(10) Patent No.: US 11,290,857 B2
(45) Date of Patent: Mar. 29, 2022

(54) INTERNET OF VEHICLES SERVICE CONFIGURATION METHOD AND DEVICE, AND METHOD, DEVICE AND SYSTEM FOR SERVICE ACQUISITION

(71) Applicant: XI'AN ZHONGXING NEW SOFTWARE CO., LTD., Shaanxi (CN)

(72) Inventors: Hui Xu, Shenzhen (CN); Yaying Wang, Shenzhen (CN); Yong Lv, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 16/324,852

(22) PCT Filed: Jul. 31, 2017

(86) PCT No.: PCT/CN2017/095303
§ 371 (c)(1),
(2) Date: Feb. 11, 2019

(87) PCT Pub. No.: WO2018/028458
PCT Pub. Date: Feb. 15, 2018

(65) Prior Publication Data
US 2019/0174280 A1    Jun. 6, 2019

(30) Foreign Application Priority Data

Aug. 12, 2016   (CN) .......................... 201610665208.4

(51) Int. Cl.
*H04W 56/00*       (2009.01)
*H04W 4/44*         (2018.01)
(Continued)

(52) U.S. Cl.
CPC ............... *H04W 4/44* (2018.02); *H04L 29/08* (2013.01); *H04W 4/06* (2013.01); *H04W 48/16* (2013.01); *H04L 12/189* (2013.01); *H04W 48/12* (2013.01)

(58) Field of Classification Search
CPC ......... H04W 4/44; H04W 4/06; H04W 48/16; H04W 48/12; H04L 29/08; H04L 12/189
(Continued)

(56) References Cited

U.S. PATENT DOCUMENTS 7,609,174 B2    10/2009  Tengler et al.
2016/0356612 A1  12/2016  Beaurepaire
(Continued)

FOREIGN PATENT DOCUMENTS

CN    102271322 A    12/2011
CN    104380655 A    2/2015
(Continued)

OTHER PUBLICATIONS

CATT. "MDT Continuity between Different PLMNs" 3GPP TSG RAN WG2 Meeting #75 R2-113938, Aug. 26, 2011 (Aug. 26, 2011).
(Continued)

*Primary Examiner* — Sai Ming Chan
(74) *Attorney, Agent, or Firm* — Foley & Lardner LLP

(57) ABSTRACT

A Vehicle-to-Everything (V2X) service configuration method includes: acquiring V2X configuration information sent by a plurality of public land mobile networks (PLMNs), where the V2X configuration information is used for instructing a user equipment (UE) to receive a V2X service; and sending the V2X configuration information to the UE.

18 Claims, 11 Drawing Sheets

(51) Int. Cl.
*H04L 65/40* (2022.01)
*H04W 4/06* (2009.01)
*H04W 48/16* (2009.01)
*H04W 48/12* (2009.01)
*H04L 12/18* (2006.01)

(58) Field of Classification Search
USPC .......................................................... 370/312
See application file for complete search history.

(56) References Cited

U.S. PATENT DOCUMENTS

| | | | |
|---|---|---|---|
| 2017/0273057 A1* | 9/2017 | Lee | H04W 72/1289 |
| 2018/0049073 A1* | 2/2018 | Dinan | H04W 72/1263 |
| 2018/0159935 A1* | 6/2018 | Cavalcanti | H04W 4/44 |
| 2018/0242115 A1* | 8/2018 | Kim | H04W 4/40 |
| 2018/0242190 A1* | 8/2018 | Khoryaev | H04L 47/283 |
| 2018/0262887 A1* | 9/2018 | Futaki | H04W 48/10 |
| 2019/0045576 A1* | 2/2019 | Jung | H04W 4/40 |
| 2019/0082352 A1* | 3/2019 | Hua | H04W 24/10 |
| 2019/0124623 A1* | 4/2019 | Xu | H04W 72/005 |

FOREIGN PATENT DOCUMENTS

| | | |
|---|---|---|
| CN | 104717614 A | 6/2015 |
| CN | 104754622 A | 7/2015 |
| CN | 105246025 A | 1/2016 |
| CN | 105323723 A | 2/2016 |
| WO | WO-2015/142082 A1 | 9/2015 |
| WO | WO-2015/147615 A1 | 10/2015 |
| WO | WO-2016/009580 A1 | 1/2016 |
| WO | WO-2016/108548 A1 | 7/2016 |

OTHER PUBLICATIONS

International Search Report and Written Opinion for International Appl. No. PCT/CN2017/095303, dated Oct. 16, 2017.
Second Office Action for CN Appl. No. 201610665208.4, dated Sep. 17, 2020.
ZTE Corporation, "DL enhancement for supporting inter-PLMN operation", 3GPP TSG-RAN WG2 Meeting #94, R2-163841, Nanjing, China, May 23-27, 2016.
3rd Generation Partnership Project: "Study on architecture enhancements for LTE support of V2X services (Release 14)" Technical Specification Group Services and System Aspects; Jun. 2016, 3GPP TR 23.785, V1.0.0; Valbonne, France.
China Telecom Co. et al.: "Discussion on V2X Communication Technology for Intelligent Networked Vehicles" Research and Application of Internet of Things; dot10,3969/issn,1000-1247.2016.05.005; May 31, 2016.
First Office Action for CN Appl. No. 201610665208.4, dated Feb. 6, 2020.
First Search Report for CN Appl. No. 201610665208.4, dated Jan. 21, 2020.
First Supplemental Search Report on CN Appl. No. 201610665208.4, dated Sep. 7, 2020.
Second Supplemental Search Report on CN Appl. No. 201610665208.4, dated May 26, 2021.
Third Office Action for CN Appl. No. 201610665208.4, dated Feb. 9, 2021.

* cited by examiner

INTERNET OF VEHICLES SERVICE CONFIGURATION METHOD AND DEVICE, AND METHOD, DEVICE AND SYSTEM FOR SERVICE ACQUISITION

CROSS-REFERENCE TO RELATED APPLICATIONS

This is a National Stage Application, under 35 U.S.C. 371, of International Patent Application No. PCT/CN2017/095303, filed on Jul. 31, 2017, which claims priority to Chinese Patent Application No. 201610665208.4, filed on Aug. 12, 2016, contents of both of which are incorporated herein by reference in their entireties.

TECHNICAL FIELD

The present application relates to, but is not limited to, the Vehicle-to-Everything (V2X) and, in particular, relates to a V2X service configuration method and apparatus, and service acquisition method, apparatus and system.

BACKGROUND

With the rapid development of economy and society, the rapid growth of China's automobile ownership and the frequent occurrence of road traffic accidents have become one of the important factors affecting the sense of public safety in China in recent years and road traffic safety has become one of the basic issues affecting social harmony and improvement of people's livelihood. China urgently needs to improve traffic safety in terms of technology, policy, education, etc. Among them, the improvement of vehicle safety design is an important part. Technologies for improving vehicle safety are mainly divided into passive safety technologies and active safety technologies. The passive safety technologies are used to protect people and articles inside and outside a vehicle in an accident. The active safety technologies are used to prevent and reduce vehicle accidents and to prevent people from being harmed. The active safety technologies are the key and trend in the development of modern vehicle safety technologies.

It has become a new way for countries to try to solve road traffic safety problems by using a communications-based collision warning system, which employs advanced wireless communication technologies and a new generation of information processing technologies, to implement real-time information interactions between vehicles and between vehicles and roadside infrastructure, inform each other of the current status (including position, speed, acceleration and traveling path of the vehicle) and the learned road environment information, cooperatively acquire road hazard conditions, and provide various collision warning information in time to prevent road traffic accidents.

Vehicle-to-Everything (V2X) refers to provision of vehicle information by means of sensors, on-board terminals and electronic tags mounted on vehicles, implementation of Vehicle-to-Vehicle (V2V), Vehicle-to-Pedestrian (V2P) and Vehicle-to-Infrastructure (V2I) intercommunications using various communication technologies, and effective use such as extraction or sharing of information on an information network platform. In this way, the vehicles are managed and controlled effectively and are provided with comprehensive services. In recent years, with the development of new mobile communication technologies, the Long Time Evolution (LTE) technology starts to be used in the world to solve problems in the research on V2X communication applications.

A Road Side Unit (RSU) has a function of gateway of receiving requests from a vehicle and ensuring the access of the vehicle to the Internet, as well as functions of data operation, storage and forwarding.

There are two existing V2X technologies: Dedicated Short Range Communication (DSRC) and LTE. The DSRC is based on IEEE802.11P standards and IEEE1609 standards. The IEEE802.11P is responsible for physical layer and medium access control (MAC) technologies and IEEE1609 is responsible for upper specifications. The LTE-based V2X technology is in an initial discussion stage and no standards has been proposed yet.

SUMMARY

The following is a summary of the subject matter described herein in detail. This summary is not intended to limit the scope of the claims.

Embodiments of the present application provide a V2X service configuration method and apparatus, and service acquisition method, apparatus and system, so that a user equipment (UE) can acquire V2X services from a plurality of public land mobile networks (PLMNs) when the UE is located within the area where the PLMNs provide the V2X services.

In a first aspect, the present application provides a V2X service configuration method. The method include the following steps: acquiring V2X configuration information sent by a plurality of PLMNs, where the V2X configuration information is used for instructing a user equipment (UE) to receive a V2X service; and sending the V2X configuration information to the UE. In an exemplary implementation mode, the plurality of PLMNs may be deployed by a plurality of operators in a same area.

In an exemplary implementation mode, the step of acquiring V2X configuration information sent by a plurality of PLMNs may include at least one of: acquiring the V2X configuration information through a public network element; acquiring the V2X configuration information through a UE search; or acquiring the V2X configuration information pre-configured. Pre-configuration refers to that the V2X configuration information in a PLMN of another operator is sent by an eNB in a current serving PLMN by way of operation and management (OAM).

In an exemplary implementation mode, the V2X configuration information may include V2X configuration information in a serving PLMN and V2X configuration information in a non-serving PLMN.

In an exemplary implementation mode, the V2X configuration information may include multimedia broadcast multicast service (MBMS) control information. The MBMS control information includes at least one of: a system information block 13 (SIB13), a SIB15, a SIB 20, a multicast control channel (MCCH), a single cell-multicast control channel (SC-MCCH) or multicast scheduling information (MSI).

In an exemplary implementation mode, the V2X configuration information may include V2X frequency configuration information in the plurality of PLMNs, where the V2X frequency configuration information is used for indicating a deployment frequency identifier of the V2X service.

In an exemplary implementation mode, the public network element may include at least one of the following network elements: a Vehicle-to-Everything application server (V2X AS), a broadcast multicast service center (BM-SC), a multimedia broadcast multicast service gateway (MBMS-GW), a mobility management entity (MME), a multi-cell/multicast coordination entity (MCE) and an evolved node B (eNB).

In a second aspect, the present application provides a V2X service acquisition method. The method includes the following steps: acquiring, by a UE, V2X configuration information of a plurality of PLMNs; and acquiring a V2X service according to the V2X configuration information of the plurality of PLMNs.

In an exemplary implementation mode, the step in which the UE acquires the V2X configuration information of the plurality of PLMNs may include receiving, through a plurality of receivers, the V2X service of the plurality of PLMNs; or receiving, through a single receiver, the V2X service of the plurality of PLMNs in a time division manner.

In an exemplary implementation mode, the step in which the UE acquires the V2X configuration information of the plurality of PLMNs may include receiving the V2X configuration information of the plurality of PLMNs sent by a V2X control function.

In an exemplary implementation mode, the step of acquiring a V2X service according to the V2X configuration information of the plurality of PLMNs may include: searching for the V2X configuration information of a specified V2X service according to a PLMN and a frequency of the specified V2X service indicated by a SIB15 acquired by the UE; reporting at least one of the frequency and the V2X configuration information to an evolved node B (eNB); and receiving the V2X service corresponding to the V2X configuration information of the specified V2X service sent by the eNB.

In an exemplary implementation mode, the method may further include: sending, by the UE to an eNB, at least one of: capability indication information for indicating a capability of receiving from more than one PLMN, or V2X service interest indication information.

In an exemplary implementation mode, the step of acquiring a V2X service according to the V2X configuration information of the plurality of PLMNs may include at least one of: receiving the V2X service of a high priority; and receiving the V2X service corresponding to the capability indication information. The capability indication information carries one of: a plurality of PLMN identifiers (IDs) or a plurality of frequency identifiers of the plurality of PLMNs from which the UE receives simultaneously.

In an exemplary implementation mode, the step in which the UE acquires the V2X configuration information of the plurality of PLMNs may include: sending a request message to the eNB, where the request message carries the V2X service interest indication information used for indicating a PLMN ID of interest to the UE, a frequency of interest of each of the PLMN IDs and a V2X service identifier of interest to the UE; and acquiring V2X configuration information of a specified PLMN sent by the eNB, where the V2X configuration information of the specified PLMN is configuration information of a PLMN which belongs to a different operator from the eNB and is located in a same coverage area with the eNB.

In a third aspect, the present application provides a V2X service configuration apparatus. The apparatus includes a first acquisition module and a first sending module. The first acquisition module is configured to acquire V2X configuration information sent by a plurality of PLMNs, where the V2X configuration information is used for instructing a UE to receive a V2X service. The first sending module is configured to send the V2X configuration information to the UE.

In an exemplary implementation mode, the first acquisition module is configured to acquire the V2X configuration information sent by the plurality of PLMNs in one of the following manners: the V2X configuration information is acquired through a public network element; the V2X configuration information is acquired through a UE search; or the pre-configured V2X configuration information is acquired.

In an exemplary implementation mode, the V2X configuration information may include MBMS control information. The MBMS control information includes at least one of: a SIB13, a SIB15, a SIB 20, an MCCH, an SC-MCCH or MSI.

In an exemplary implementation mode, the V2X configuration information may include V2X frequency configuration information in the plurality of PLMNs. The V2X frequency configuration information is used for indicating a deployment frequency identifier of the V2X service.

In a fourth aspect, the present application provides a V2X service acquisition apparatus. The apparatus includes a second acquisition module and a third acquisition module. The second acquisition module is configured to acquire V2X configuration information of a plurality of PLMNs. The third acquisition module is configured to acquire a V2X service according to the V2X configuration information of the plurality of PLMNs.

In an exemplary implementation mode, the second acquisition module may include a first acquisition unit or a second acquisition unit. The first acquisition unit is configured to receive, through a plurality of receivers, the V2X service of the plurality of PLMNs. The second acquisition unit is configured to receive, through a single receiver, the V2X service of the plurality of PLMNs in a time division manner.

In an exemplary implementation mode, the second acquisition module may include a third acquisition unit. The third acquisition unit is configured to receive the V2X configuration information of the plurality of PLMNs sent by a V2X control function.

In an exemplary implementation mode, the third acquisition module may include a search unit, a reporting unit and a first receiving unit. The search unit is configured to search for V2X configuration information of a specified V2X service according to a PLMN and a frequency of the specified V2X service indicated by an acquired SIB15. The reporting unit is configured to report at least one of the frequency and the V2X configuration information to an eNB. The first receiving unit is configured to receive the V2X service corresponding to the V2X configuration information of the specified V2X service sent by the eNB.

In an exemplary implementation mode, the apparatus may further include a second sending module. The second sending module is configured to send an eNB at least one of: capability indication information for indicating a capability of receiving from more than one PLMN, or V2X service interest indication information.

In an exemplary implementation mode, the third acquisition module may include at least one of: a second receiving unit or a third receiving unit.

The second receiving unit is configured to receive the V2X service of a high priority.

The third receiving unit is configured to receive the V2X service corresponding to the capability indication information. The capability indication information carries one of: a plurality of PLMN IDs or a plurality of frequency identifiers of the plurality of PLMNs from which the V2X service is received simultaneously.

In an exemplary implementation mode, the second acquisition module may include a request unit and a fourth acquisition unit.

The request unit is configured to send a request message to the eNB, where the request message carries the V2X service interest indication information used for indicating a PLMN identifier (ID) of interest to a UE, a frequency of interest of each of the PLMN IDs and a V2X service identifier of interest to the UE.

The fourth acquisition unit is configured to acquire V2X configuration information of a specified PLMN sent by the eNB. The V2X configuration information of the specified PLMN is configuration information of a PLMN which belongs to a different operator from the eNB and is located in a same coverage area with the eNB.

In a fifth aspect, the present application provides a V2X service acquisition system, including a sender device and a receiver device. The sender device is configured to acquire V2X configuration information sent by a plurality of PLMNs and send the V2X configuration information to the receiver device. The V2X configuration information is used for instructing the receiver device to receive a V2X service. The receiver device is configured to acquire the V2X configuration information of the plurality of PLMNs and acquire the V2X service according to the V2X configuration information of the plurality of PLMNs.

In an exemplary implementation mode, the sender device may include at least one of: a public network element, a UE or a V2X control function. The public network element may include at least one of: a V2X AS, a BM-SC, an MBMS-GW, an MME, an MCE and an eNB. The receiver device may include the UE.

In another aspect, the present application further provides a computer-readable medium. The computer-readable medium is configured to store program codes for executing the steps described below.

In S11, V2X configuration information sent by a plurality of PLMNs is acquired, where the V2X configuration information is used for instructing a UE to receive a V2X service.

In S12, the V2X configuration information is sent to the UE.

In yet another aspect, the present application further provides a computer-readable medium. The computer-readable medium is configured to store program codes for executing the steps described below.

In S21, V2X configuration information of a plurality of PLMNs is acquired.

S22, a V2X service is acquired according to the V2X configuration information of the plurality of PLMNs.

In the embodiments of the present application, the V2X configuration information of the plurality of PLMNs is acquired and sent to the UE so that the UE acquires the corresponding V2X service according to the V2X configuration information. Therefore, when UE is located within the area where multiple PLMNs provide V2X services, the UE can acquire the V2X services from the PLMNs so that the UE can receive V2X services from different PLMNs in the case where a plurality of operators deploy a plurality of MBMS networks.

Other aspects can be understood after the drawings and detailed description are read and understood.

DETAILED DESCRIPTION

The present disclosure will be described hereinafter in detail through embodiments with reference to the drawings. It is to be noted that the terms "first", "second" and the like in the description, claims and drawings of the present application are used to distinguish between similar objects and are not necessarily used to describe a particular order or sequence.

Figure 1:
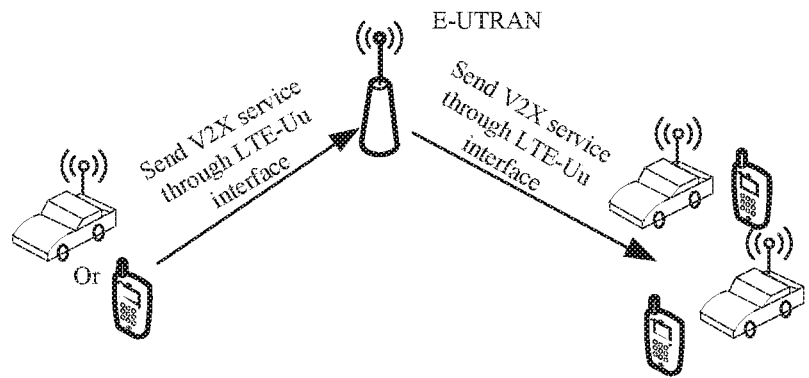
FIG. 1 is a schematic diagram of a system architecture implementing V2X service interactions.

An LTE V2X technology currently discussed in the 3rd Generation Partnership Project (3GPP) includes that an RSU may be implemented through stationary user equipment (UE) or an evolved Node B (eNB) and that V2V/V2I/V2P may be implemented through a PC5 interface or a Uu interface. The PC5 interface refers to a device-to-device (D2D) air interface and the Uu interface refers to an air interface from the UE to the eNB. FIG. 1 is a schematic diagram illustrating a system architecture implementing V2X service interactions. The eNB sends a V2X service to one or more UEs through the Uu interface.

To effectively utilize mobile network resources, the 3GPP proposes a multimedia broadcast multicast service (MBMS). The MBMS is a technology for transmitting data from one data source to multiple target mobile terminals, achieving sharing of network (including a core network and an access network) resources and improving a utilization rate of the network resource (especially air interface resources). LTE-Advanced (LTE-A) in the 3GPP Release 13 (R13) proposes a research topic of a single cell-MBMS. The single cell-MBMS is transmitted in a physical downlink shared channel (PDSCH). In a 3GPP network, the MBMS is identified by a temporary mobile subscriber identity (TMGI), and the TMGI is allocated by a broadcast multicast service center (BM-SC). An application server (AS) notifies the UE of related service description information such as the TMGI and service start time via application layer signaling. Single cell point-to-multipoint (SC-PTM) is another method for transmitting a broadcast service in the PDSCH. A multicast broadcast single frequency network (MBSFN) is the same as the core network of the SC-PTM. In the access network, a multi-cell/multicast coordination entity (MCE) determines to use the MBSFN or the SC-PTM for sending the broadcast service through the air interface. A traffic safety service generally is directed to multiple vehicles in a certain area. Downlink broadcast transmission is an efficient way. Downlink unicast transmission is difficult to meet capacity requirements of the V2X service according to simulation evaluation. A vehicle which sends the V2X service is moving at a high speed and a service area or cell may frequently change. If the vehicle (or the UE) enters an MBMS service area, the vehicle (or the UE) needs to read a user service description (USD). The USD includes a service identifier, a deployment frequency, start/end time, the service area and the like. The UE determines a required V2X service according to the USD, monitors control information of the required V2X service, and reads the required V2X service.

Figure 2A:
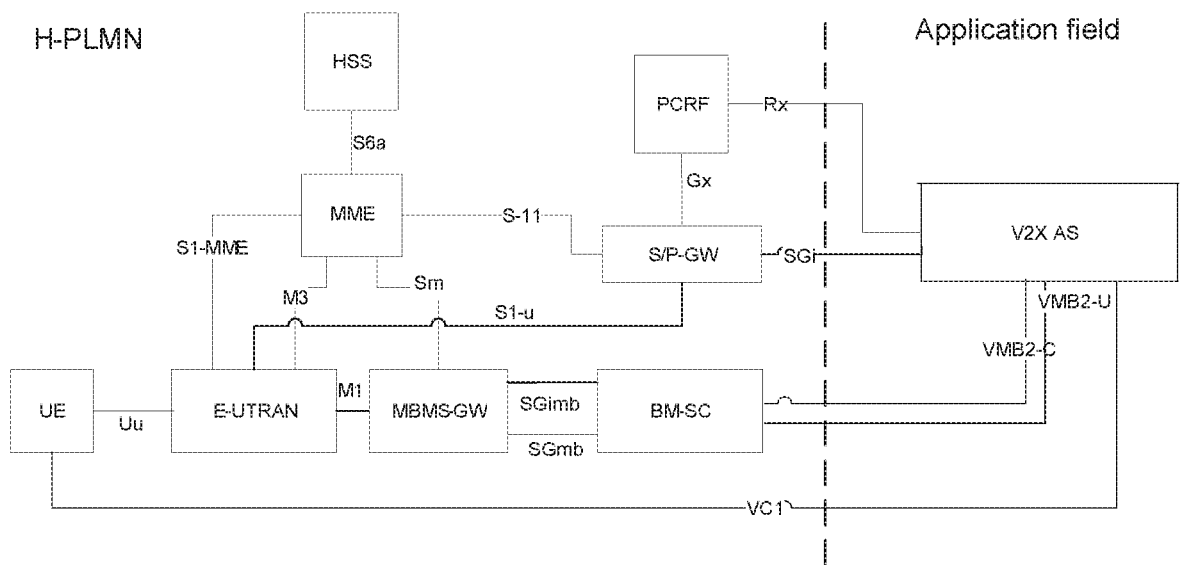
FIG. 2a is a schematic diagram of a system architecture implementing V2X service transmission with an MBMS.
Figure 2B:
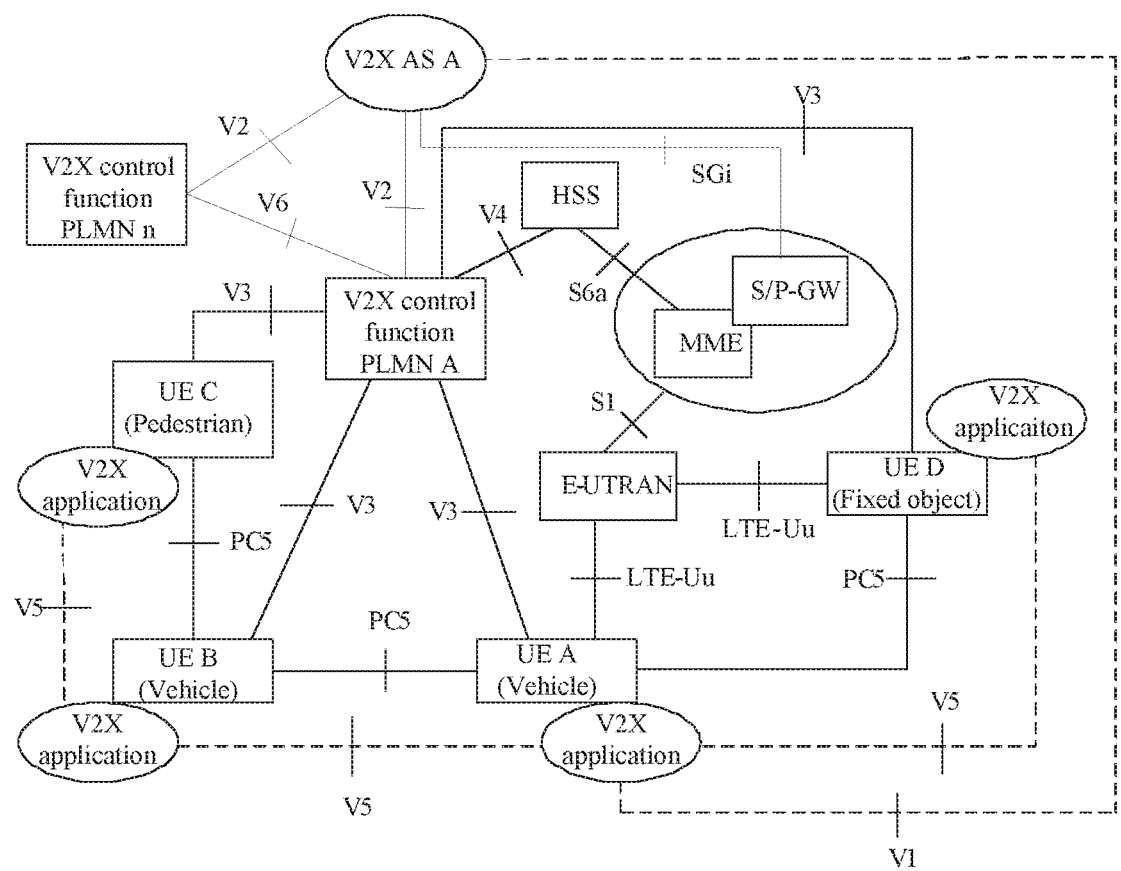
FIG. 2b is a schematic diagram of a D2D system architecture implementing V2X services.

FIG. 2a is a schematic diagram of a system architecture implementing V2X service transmission by use of an MBMS. FIG. 2b is a schematic diagram of a D2D system architecture implementing V2X services. HSS refers to a home subscriber server, MME refers to a mobility management entity, PCRF refers to a policy and charging rules function, MBMS-GW refers to a MBMS Gateway, S/P-GW refers to a serving gateway (S-GW) or a packet data network gateway (P-GW), E-UTRAN refers to an evolved universal terrestrial radio access network, BM-SC refers to the broadcast multicast service center, and V2X AS refers to a V2X application server.

Figure 3A:
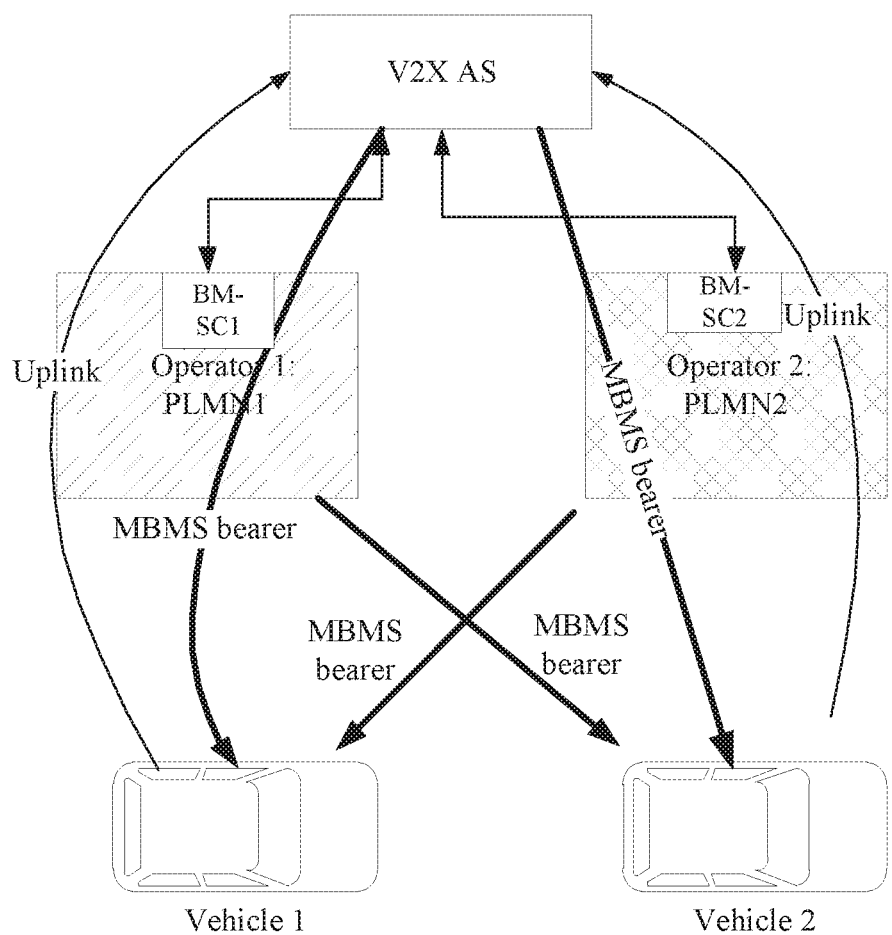
FIG. 3a and FIG. 3b are diagrams of V2X service interaction scenarios.
Figure 3B:
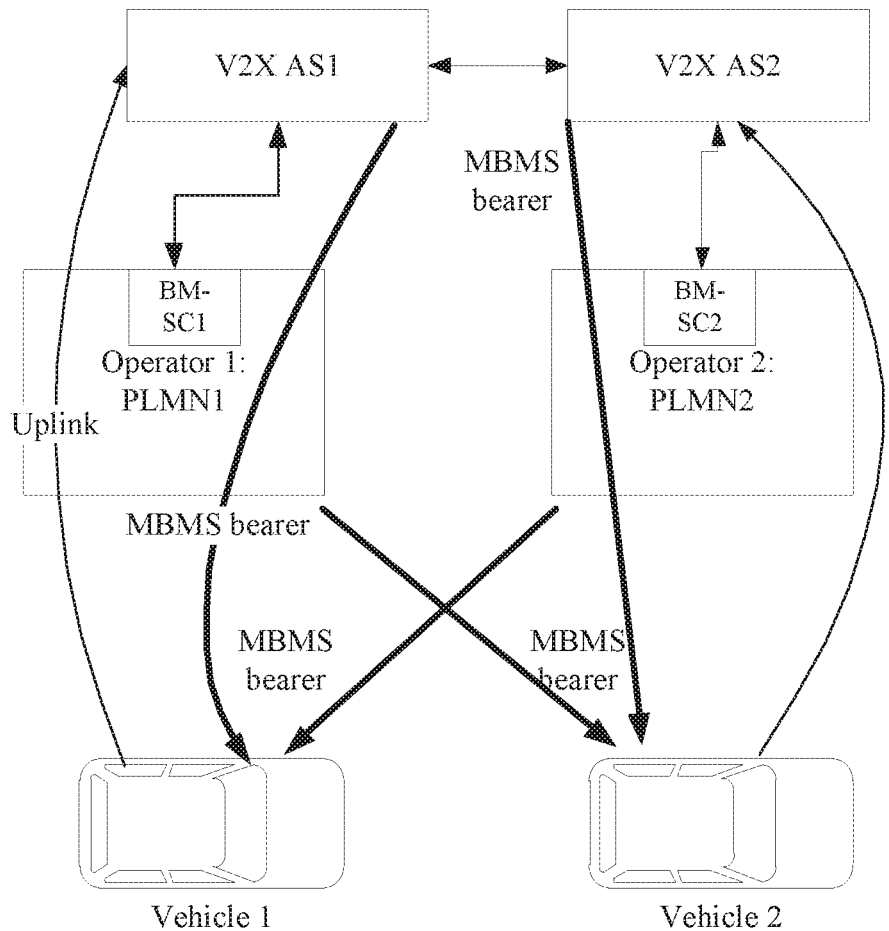

Different operators may deploy their own MBMS networks. FIG. 3a and FIG. 3b are diagrams of V2X service interaction scenarios. As shown in FIG. 3a and FIG. 3b, one or more V2X ASs may be included. Currently the 3GPP requires the UE to receive the V2X service of another operator, that is, to receive data in different public land mobile networks (PLMNs). A vehicle 1 or a vehicle 2 in FIG. 3a and FIG. 3b should be capable of receiving V2X services of an operator 1 and an operator 2.

However, since the LTE MBMS does not support roaming, that is, the UE cannot receive the MBMS of another PLMN other than a serving PLMN, the UE cannot acquire the V2X service in multiple PLMNs when the multiple PLMNs provide the V2X service in an area where the UE is located.

Figure 4:
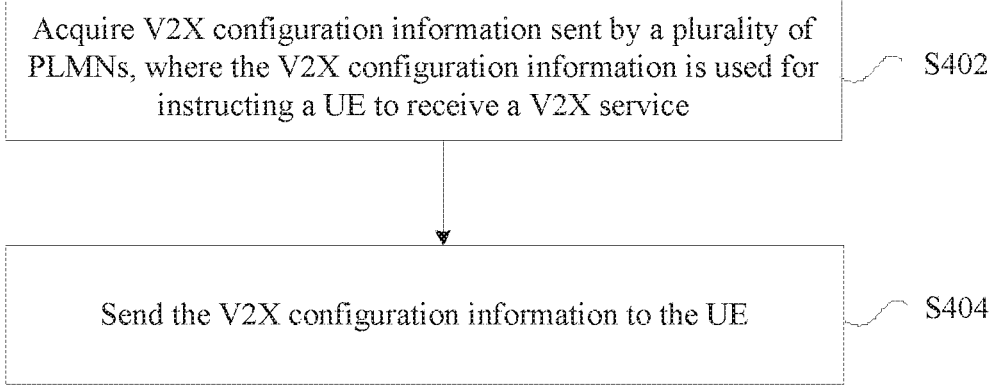
FIG. 4 is a flowchart of a V2X service configuration method according to an embodiment of the present application.

FIG. 4 is a flowchart of a V2X service configuration method according to an embodiment of the present application. The V2X service configuration method in the embodiment may be executed under the architecture shown in FIG. 2a or 2b. As shown in FIG. 4, the V2X service configuration method in the embodiment includes the steps described below.

In step S402, V2X configuration information sent by a plurality of PLMNs is acquired, where the V2X configuration information is used for instructing a UE to receive a V2X service. In an exemplary implementation mode, the plurality of PLMNs may be deployed by a plurality of operators in a same area. The same area refers to that the PLMNs of the plurality of operators are located in a coverage area of a same eNB.

In an exemplary implementation mode, the step of acquiring the V2X configuration information sent by the plurality of PLMNs may include at least one of the steps described below.

The V2X configuration information is acquired through a public network element.

The V2X configuration information is acquired through a UE search.

The pre-configured V2X configuration information is acquired.

When the V2X configuration information is acquired through the public network element, the public includes at least one of the following network elements: a V2X AS, a BM-SC, an MBMS-GW, an MME, an MCE and an eNB.

If the V2X configuration information is acquired through the UE search, the UE sends the V2X configuration information to the eNB and the eNB broadcasts the V2X configuration information to all UEs in the coverage area of the eNB.

In an exemplary implementation mode, the V2X configuration information in the embodiment may include V2X configuration information in a serving PLMN and V2X configuration information in a non-serving PLMN.

If the V2X configuration information is acquired by acquiring the pre-configured V2X configuration information, the V2X configuration information in the non-serving PLMN may be sent to the serving PLMN in an OAM manner.

In an exemplary implementation mode, the V2X configuration information in the embodiment may further include MBMS control information and V2X frequency configuration information. The MBMS control information includes at least one of: a system information block 13 (SIB13), a SIB15, a SIB 20, a multicast control channel (MCCH), a single cell-multicast control channel (SC-MCCH) or multicast scheduling information (MSI). The V2X frequency configuration information is used for indicating a deployment frequency identifier of the V2X service. For example, the frequency is a frequency currently used by the V2X service.

In step S404, the V2X configuration information is sent to the UE.

In the above steps, when UE is located within the area where multiple PLMNs provide the V2X services, the UE can acquire the V2X services from the PLMNs so that the UE can receive V2X services from different PLMNs in the case where a plurality of operators deploy a plurality of MBMS networks.

Figure 5:
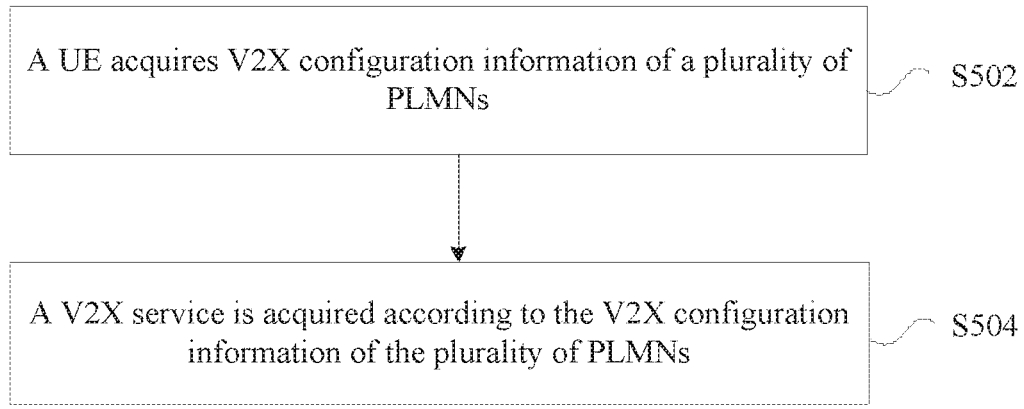
FIG. 5 is a flowchart of a V2X service acquisition method according to an embodiment of the present application.

FIG. 5 is a flowchart of a V2X service acquisition method according to an embodiment of the present application. The V2X service acquisition method in the embodiment may be executed under the architecture shown in FIG. 2a or 2b. As shown in FIG. 5, the V2X service acquisition method in the embodiment includes the steps described below.

In step S502, a UE acquires V2X configuration information of a plurality of PLMNs.

In an exemplary implementation mode, the UE may receive, through a plurality of receivers, a V2X service of the plurality of PLMNs; or may also receive, through a single receiver, the V2X service of the plurality of PLMNs in a time division manner.

In an exemplary implementation mode, the UE may receive the V2X configuration information of the plurality of PLMNs sent by a V2X control function. The V2X control function may be a logical network element.

In an exemplary implementation mode, the UE may send an eNB at least one of: capability indication information for indicating a capability of receiving from more than one PLMN, or V2X service interest indication information.

The UE sends a request message carrying the V2X service interest indication information to the eNB to acquire V2X configuration information of a specified PLMN sent by the eNB. The V2X service interest indication information may include a PLMN identifier (ID) of interest to the UE, a frequency of interest of each of the PLMN IDs and a V2X service identifier of interest to the UE. The V2X configuration information of the specified PLMN may refer to the V2X configuration information corresponding to the V2X service required by the UE.

In an exemplary implementation mode, after the UE sends the request message carrying the V2X service interest indication information to the eNB, the UE can acquire the V2X configuration information of the specified PLMN. The V2X configuration information of the specified PLMN is configuration information of a PLMN different from a PLMN of the eNB and is located in a same coverage area with the eNB. In this way, the UE can acquire the V2X configuration information of another PLMN.

In step S504, the V2X service is acquired according to the V2X configuration information of the plurality of PLMNs.

In an exemplary implementation mode, the UE may search for the V2X configuration information of a specified V2X service according to a PLMN and a frequency of the specified V2X service indicated by a SIB15 acquired by the UE; report at least one of the frequency and the V2X configuration information to the eNB; and receive the V2X service corresponding to the V2X configuration information of the specified V2X service sent by the eNB.

It should be noted that the SIB15 includes the V2X configuration information in a non-serving PLMN. The UE can determine the PLMN and the frequency of the specified V2X service according to the V2X configuration information in the non-serving PLMN.

In an exemplary implementation mode, when a single receiver is used, the UE cannot simultaneously receive a plurality of specified V2X services. Therefore, the UE needs to receive, according to a priority of the plurality of specified V2X services, the V2X service of a high priority before the V2X service of a low priority.

The UE may also send the capability indication information for indicating the capability of receiving from more than one PLMN to the eNB so that the eNB can allocate resources to the plurality of specified V2X services according to the capability indication information, thereby ensuring that the plurality of specified V2X services are received at different time points. The capability indication information includes one of: a plurality of PLMN identifiers (IDs) or a plurality of frequency identifiers of the plurality of PLMNs from which the UE receives simultaneously.

The present application will be described below by way of a plurality of application scenarios. In a scenario 1, V2X configuration information of another PLMN is forwarded through a public network element.

Figure 6:
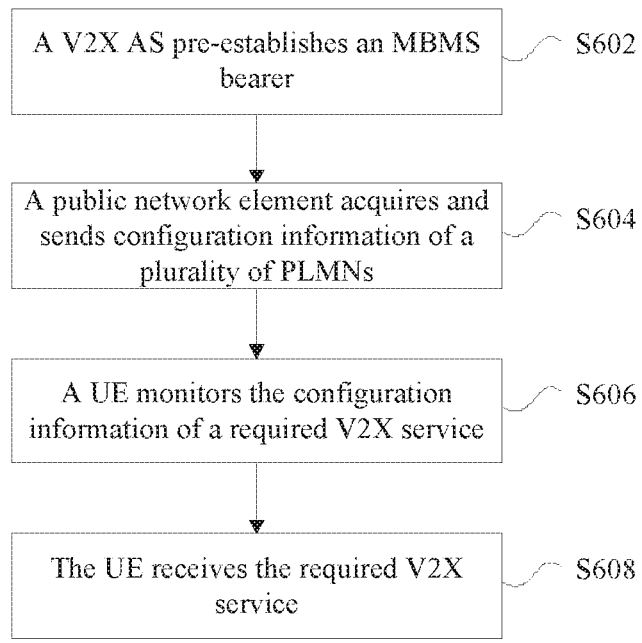
FIG. 6 is a flowchart of a V2X service acquisition method in a scenario 1 according to an embodiment of the present application.

FIG. 6 is a flowchart of a V2X service acquisition method in a scenario 1 according to an embodiment of the present application. As shown in FIG. 6, the V2X service acquisition method in the scenario 1 includes the steps described below.

In step S602, a V2X AS pre-establishes an MBMS bearer in each of different PLMNs. The AS interacts with a BM-SC in each PLMN, such as requesting a required TMGI, establishment, activation, or establishing and activating the MBMS bearer.

In step S604, the public network element acquires and sends configuration information of a plurality of PLMNs. Except the V2X AS, other network elements need network sharing deployment, that is, the different PLMNs share a same network element. The V2X AS may acquire MBMS air interface control information of each PLMN through a V1 interface, and summarize and send control information in the plurality of PLMNs to a UE through the V1 interface. The other public network elements acquire V2X control information in the plurality of PLMNs and send the V2X control information to the UE. The configuration information further includes V2X frequency information of the plurality of PLMNs and air interface configuration information corresponding to V2X frequencies.

In step S606, the UE monitors and receives the V2X configuration information. The UE monitors the configuration information corresponding to a required V2X service. The configuration information includes configuration information of a serving PLMN and a non-serving PLMN such as one of: the V2X frequency information, a SIB13/SIB20, MCCH/SC-MCCH information of the different PLMNs.

In step S608, the UE receives required V2X service data. The AS receives V2X information sent by the UE in different PLMNs, and the AS sends the V2X information in the corresponding PLMNs according to the PLMNs to which the UE belongs. The UE receives the required V2X service data according to the configuration information of the required V2X service. The V2X service data includes the V2X service in the plurality of PLMNs.

In a scenario 2, V2X service configuration information of a plurality of PLMNs is sent through a V2X control function.

Figure 7:
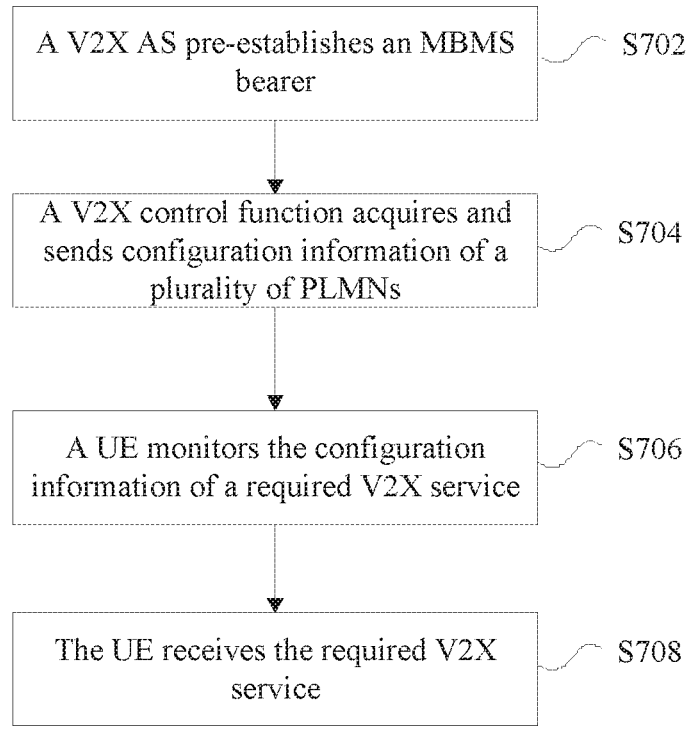
FIG. 7 is a flowchart of a V2X service acquisition method in a scenario 2 according to an embodiment of the present application.

FIG. 7 is a flowchart of a V2X service acquisition method in a scenario 2 according to an embodiment of the present application. As shown in FIG. 7, the V2X service acquisition method in the scenario 2 includes the steps described below.

In step S702, a V2X AS pre-establishes an MBMS bearer in different PLMNs. The AS interacts with a BM-SC in each PLMN, such as requesting a required TMGI, establishment, activation, or establishing and activating the MBMS bearer.

In step S704, the V2X control function acquires and sends configuration information of a plurality of PLMNs. An interface exists between the V2X control functions in the different PLMNs. The V2X control function may acquire the configuration information in the PLMN through a UE and send the configuration information through the interface between each other. The V2X control function may send the configuration information of the plurality of PLMNs.

In step S706, the UE monitors the configuration information of a required V2X service. The UE monitors the configuration information of the required V2X service according to the determined required V2X service. The UE acquires the V2X configuration information of a non-serving PLMN through an interface between the UE and the V2X control function.

In step S708, the UE acquires required V2X service data. The V2X AS sends a corresponding V2X service through the MBMS bearer in different PLMNs, and the UE receives the required V2X service data in other PLMNs. If the UE has a plurality of receivers, the UE may receive, through different receivers, a required V2X service from the different PLMNs. To decrypt the V2X service data in the non-serving PLMN, the UE requests a key from the AS. The AS interacts with a related BM-SC to acquire the key required by the UE, and sends the key to the UE. Furthermore, the AS may interact with the BM-SC to authenticate the UE, that is, to determine whether the UE is allowed to receive the V2X service in the non-serving PLMN.

Scenario 3

Figure 8:
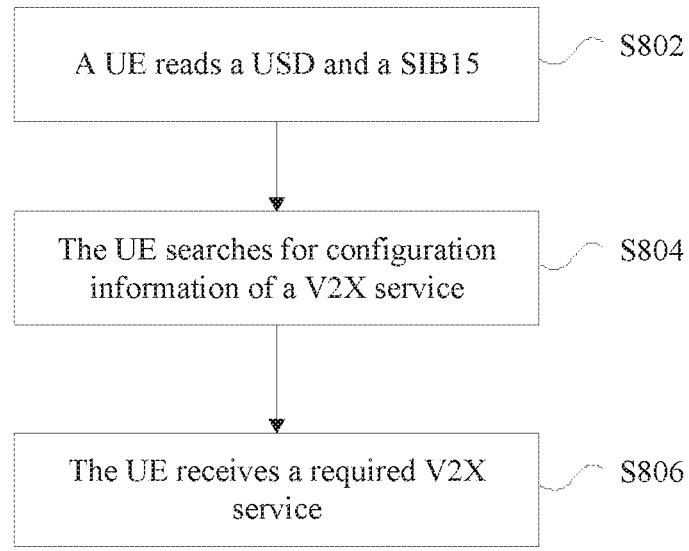
FIG. 8 is a flowchart of a V2X service acquisition method in a scenario 3 according to an embodiment of the present application.

FIG. 8 is a flowchart of a V2X service acquisition method in a scenario 3 according to an embodiment of the present application. As shown in FIG. 8, the V2X service acquisition method in the scenario 3 includes the steps described below.

In step S802, a UE reads a USD and a SIB15. The USD and the SIB 15 include V2X configuration information of a non-serving PLMN. The UE determines a PLMN and a frequency of a required V2X service according to the USD and the SIB15.

In step S804, the UE searches for configuration information of the V2X service. The UE searches for the configuration information of the required V2X service on the PLMN and the frequency indicated by the SIB 15.

In step S806, the UE receives the required V2X service. The UE determines, according to its own capability, a method for receiving the V2X service in a plurality of PLMNs. If the UE has a plurality of receivers, the UE may simultaneously receive the required V2X service in the plurality of PLMNs. If the UE has a single receiver, the UE cannot simultaneously receive the required V2X service in the plurality of PLMNs. At this time, the UE may select to receive the V2X service of a high priority according to a priority of the V2X service. Alternatively, the UE sends a request to an eNB, where the request indicates a PLMN ID and the frequency of the V2X service to be received; the eNB allocates air interface resources according to a request message and the capability of the UE so that the V2X service in different PLMNs is received at different time points the UE is guaranteed to receive the V2X service in the plurality of PLMNs.

Scenario 4

Figure 9:
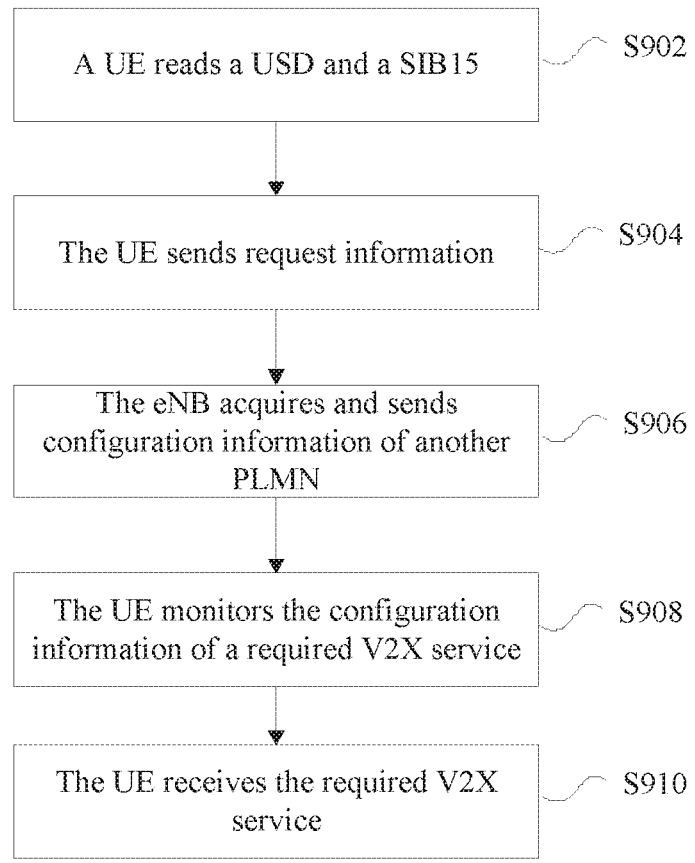
FIG. 9 is a flowchart of a V2X service acquisition method in a scenario 4 according to an embodiment of the present application.

FIG. 9 is a flowchart of a V2X service acquisition method in a scenario 4 according to an embodiment of the present application. As shown in FIG. 9, the V2X service acquisition method in the scenario 4 includes the steps described below.

In step S902, a UE reads a USD and a SIB15.

In step S904, the UE sends request information.

The UE sends the request information to an eNB through an air interface. The request information includes one of: a PLMN ID of interest to the UE, a frequency of interest of each PLMN ID and a V2X service identifier of interest to the UE. The request information is signaling at a layer 1, a layer 2, or a layer 3. If the request information is Radio Resource Control (RRC) signaling at the layer 3, MBMS interest indication information or new dedicated signaling may be adopted.

In step S906, the eNB acquires and sends configuration information of another PLMN. The eNB acquires the configuration information of another PLMN according to the request information of the UE. The another PLMN refers to a PLMN different from the PLMN of the eNB in a same area. A number of the another PLMN may be one or more. The eNB may acquire the above information through an X2 interface between the eNBs or through a public network element. The public network element may include one of: a V2X AS, a BM-SC, an MBMS-GW, an MME, an MCE and the eNB. Except the V2X AS, other network elements need network sharing deployment, that is, different PLMNs share a same network element. If the public network element is used and a direct interface does not exist between the public network element and the eNB, the configuration information may be acquired through a plurality of interfaces. After acquiring the configuration information, the eNB combines the configuration information with the corresponding local information and sends the combined information. For example, after the eNB in a PLMN1 acquires a SIB13 of a PLMN2, the eNB integrates the SIB13 of the PLMN2 with a SIB13 of the PLMN1 to form a new SIB13 and sends the new SIB13.

In step S908, the UE monitors the configuration information of a required V2X service.

In step S910, the UE receives the required V2X service. The AS establishes a corresponding MBMS bearer in different PLMNs. For example, an AS1 receives a V2X service 1 sent by a UE1 in the PLMN1, and an AS2 receives a V2X service 2 sent by a UE2 in the PLMN2; and the AS1 establishes a TMGI1, the MBMS bearer, for the V2X service 1 in the PLMN1, and similarly, the AS2 establishes a TMGI2 in the PLMN2. At this time, the TMGI1 and the TMGI2 are indicated in the USD and the SIB/MCCH of the PLMN1, and are also indicated in the USD and the SIB/MCCH of the PLMN2. If the UE has two receivers, the UE receives the required V2X service in the PLMN1 and the PLMN2 respectively. To acquire a key of the V2X service in a non-serving PLMN, the UE may send a request to the AS to which the UE belongs and the AS requests the key from another AS through an interface. The another AS acquires the corresponding key and authentication information of the UE through the BM-SC and sends the key to the request AS which sends the key to the UE. For the UE with a single receiver, the UE may request a gap from the eNB of the UE. The gap is used for receiving the required V2X service in another PLMN. Alternatively, the UE selects to receive a service of a high priority according to different priorities of the V2X service. The UE may also receive the required V2X service at opportunities in a discontinuous reception (DRX) if the required V2X service has a low priority.

Figure 10:
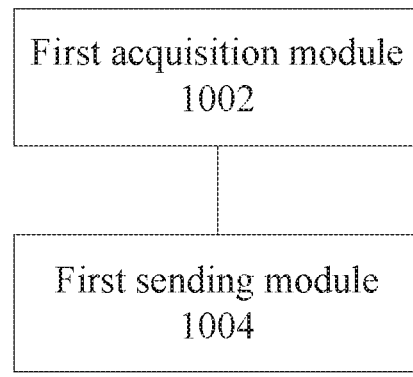
FIG. 10 is a block diagram of a V2X service configuration apparatus according to an embodiment of the present application.

FIG. 10 is a block diagram of a V2X service configuration apparatus according to an embodiment of the present application. As shown in FIG. 8, the apparatus includes a first acquisition module 1002 and a first sending module 1004.

The first acquisition module 1002 is configured to acquire V2X configuration information sent by a plurality of PLMNs, where the V2X configuration information is used for instructing a UE to receive a V2X service.

In an exemplary implementation mode, the plurality of PLMNs may be deployed by a plurality of operators in a same area. The same area refers to that the PLMNs of the plurality of operators are located in a coverage area of a same eNB.

In an exemplary implementation mode, the first acquisition module 1002 is configured to acquire the V2X configuration information sent by the plurality of PLMNs in one of the manners described below.

The V2X configuration information is acquired through a public network element.

The V2X configuration information is acquired through a UE search.

The pre-configured V2X configuration information is acquired.

When the V2X configuration information is acquired through the public network element, the public may include at least one of the following network elements: a V2X AS, a BM-SC, an MBMS-GW, an MME, an MCE and an eNB.

If the V2X configuration information is acquired through the UE search, the UE sends the V2X configuration information to the eNB and the eNB broadcasts the V2X configuration information to all UEs in the coverage area of the eNB.

In an exemplary implementation mode, the V2X configuration information in the embodiment may include V2X configuration information in a serving PLMN and V2X configuration information in a non-serving PLMN.

If the V2X configuration information is acquired by acquiring the pre-configured V2X configuration information, the V2X configuration information in the non-serving PLMN may be sent to the serving PLMN in an OAM manner.

In an exemplary implementation mode, the V2X configuration information in the embodiment may further include MBMS control information and V2X frequency configuration information. The MBMS control information may include at least one of: a SIB13, a SIB15, a SIB 20, an MCCH, an SC-MCCH or MSI. The V2X frequency configuration information is used for indicating a frequency identifier of the V2X service. For example, the frequency is a frequency currently used by the V2X service.

The first sending module 1004 is configured to send the V2X configuration information to the UE.

Figure 11:
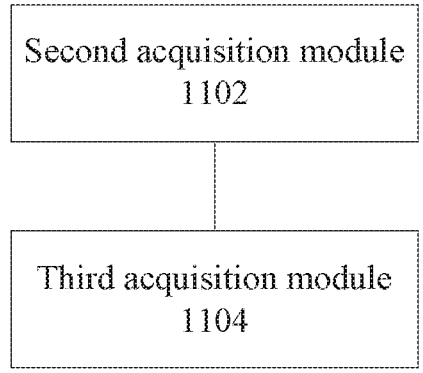
FIG. 11 is a block diagram of a V2X service acquisition apparatus according to an embodiment of the present application.

FIG. 11 is a block diagram of a V2X service acquisition apparatus according to an embodiment of the present application. As shown in FIG. 11, the apparatus includes a second acquisition module 1102 and a third acquisition module 1104.

The second acquisition module 1102 is configured to acquire V2X configuration information of a plurality of PLMNs.

The third acquisition module 1104 is configured to acquire a V2X service according to the V2X configuration information of the plurality of PLMNs.

Figure 12:
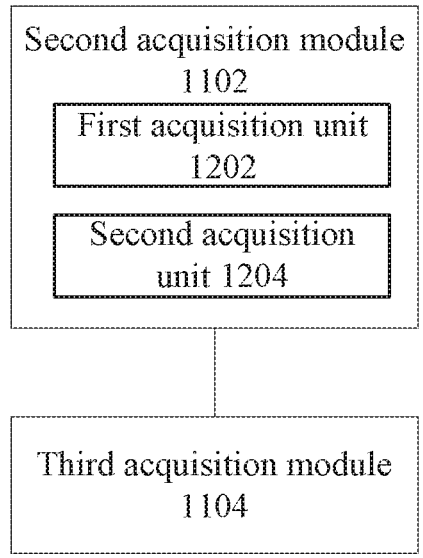
FIG. 12 is an exemplary block diagram of a V2X service acquisition apparatus according to an embodiment of the present application.

FIG. 12 is an example block diagram of a V2X service acquisition apparatus according to an embodiment of the present application. As shown in FIG. 12, the apparatus includes all the modules shown in FIG. 11, where the second acquisition module 1102 may include a first acquisition unit 1202 or a second acquisition unit 1204.

The first acquisition unit 1202 is configured to receive, through a plurality of receivers, the V2X service of the plurality of PLMNs.

The second acquisition unit 1204 is configured to receive, through a single receiver, the V2X service of the plurality of PLMNs in a time division manner.

Figure 13:
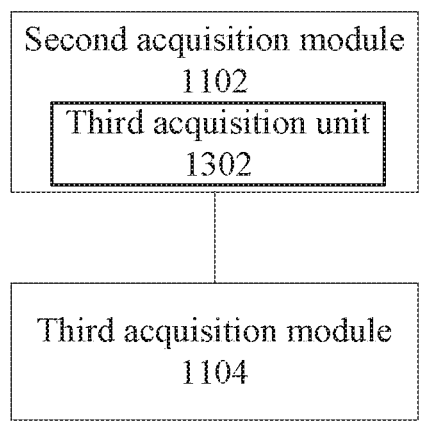
FIG. 13 is an exemplary block diagram of a V2X service acquisition apparatus according to an embodiment of the present application.

FIG. 13 is an example block diagram of a V2X service acquisition apparatus according to an embodiment of the present application. As shown in FIG. 13, the apparatus includes all the modules shown in FIG. 11, where the second acquisition module 1102 may further include a third acquisition unit 1302. The third acquisition unit 1302 is configured to receive the V2X configuration information of the plurality of PLMNs sent by a V2X control function.

Figure 14:
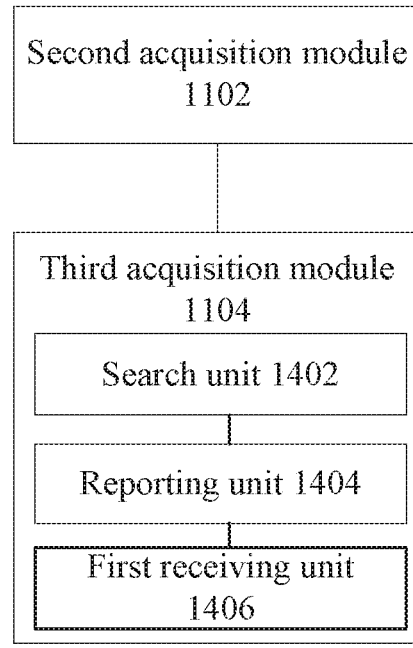
FIG. 14 is an exemplary block diagram of a V2X service acquisition apparatus according to an embodiment of the present application.

FIG. 14 is an example block diagram of a V2X service acquisition apparatus according to an embodiment of the present application. As shown in FIG. 14, the apparatus includes all the modules shown in FIG. 11, where the third acquisition module 1104 may include a search unit 1402, a reporting unit 1404 and a first receiving unit 1406.

The search unit 1402 is configured to search for V2X configuration information of a specified V2X service according to a PLMN and a frequency of the specified V2X service indicated by an acquired SIB15.

The reporting unit 1404 is configured to report at least one of the frequency and the V2X configuration information to an eNB.

The first receiving unit 1406 is configured to receive the V2X service corresponding to the V2X configuration information of the specified V2X service sent by the eNB.

Figure 15:
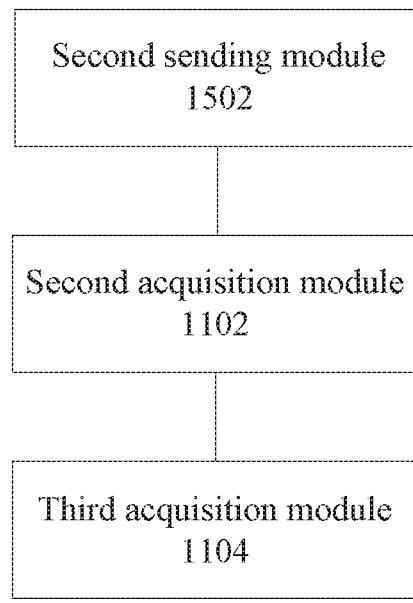
FIG. 15 is an exemplary block diagram of a V2X service acquisition apparatus according to an embodiment of the present application.

FIG. 15 is an exemplary block diagram of a V2X service acquisition apparatus according to an embodiment of the present application. As shown in FIG. 15, in addition to all the modules shown in FIG. 11, the apparatus may further include a second sending module 1502.

The second sending module 1502 is configured to send an eNB at least one of: capability indication information for indicating a capability of receiving from more than one PLMN, or V2X service interest indication information.

Figure 16:
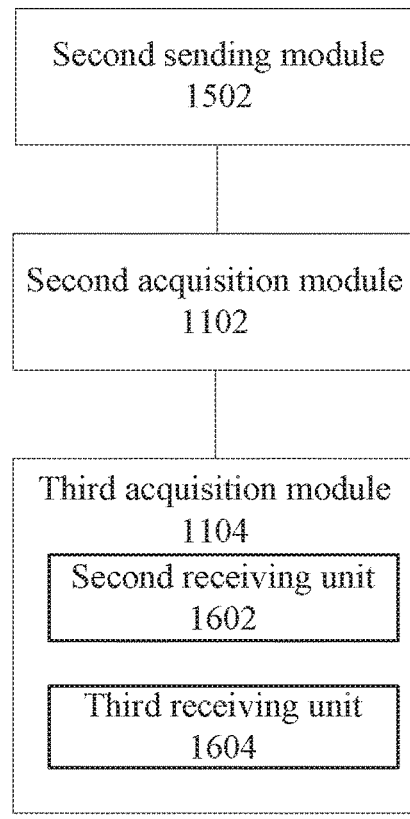
FIG. 16 is an exemplary block diagram of a V2X service acquisition apparatus according to an embodiment of the present application.

FIG. 16 is an exemplary block diagram of a V2X service acquisition apparatus according to an embodiment of the present application. As shown in FIG. 16, the apparatus includes all the modules shown in FIG. 15, where the third acquisition module 1104 may include at least one of a second receiving unit 1602 and a third receiving unit 1604.

The second receiving unit 1602 is configured to receive the V2X service of a high priority.

The third receiving unit 1604 is configured to receive the V2X service corresponding to the capability indication information. The capability indication information carries one of: a plurality of PLMN IDs or a plurality of frequency identifiers of the plurality of PLMNs from which the V2X service is received simultaneously.

Figure 17:
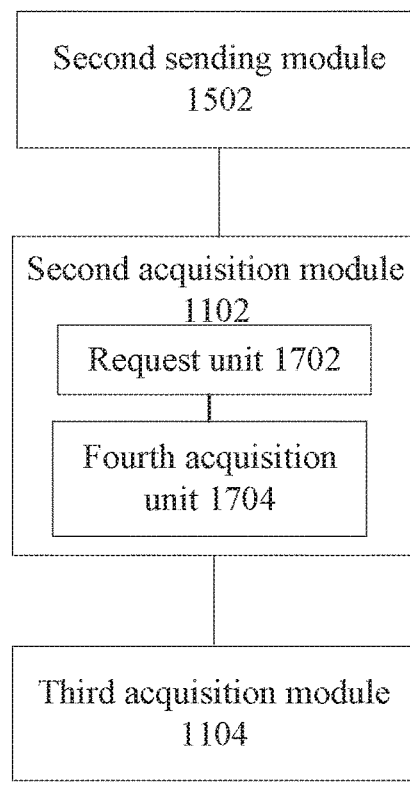
FIG. 17 is an exemplary block diagram of a V2X service acquisition apparatus according to an embodiment of the present application.

FIG. 17 is an exemplary block diagram of a V2X service acquisition apparatus according to an embodiment of the present application. As shown in FIG. 17, the apparatus includes all the modules shown in FIG. 15, where the second acquisition module 1102 may include a request unit 1702 and a fourth acquisition unit 1704.

The request unit 1702 is configured to send a request message to the eNB. The request message carries the V2X service interest indication information used for indicating a PLMN ID of interest to a UE, a frequency of interest of each of the PLMN IDs and a V2X service identifier of interest to the UE.

The fourth acquisition unit 1704 is configured to acquire V2X configuration information of a specified PLMN sent by the eNB. The V2X configuration information of the specified PLMN is configuration information of a PLMN different from a PLMN of the eNB and is located in a same coverage area with the eNB.

It should be noted that the one or more modules described above may be implemented by software or hardware. Implementation by hardware may, but may not necessarily, be performed by the following manners: the one or more modules described above are located in a same processor or their respective processors.

Figure 18:
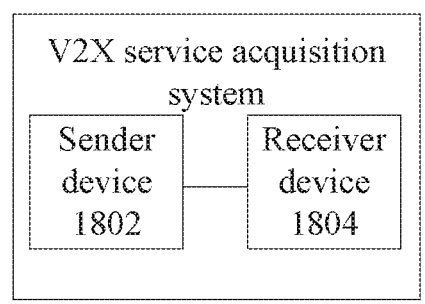
FIG. 18 is a block diagram of a V2X service acquisition system according to an embodiment of the present application.

FIG. 18 is a block diagram of a V2X service acquisition system according to an embodiment of the present application. As shown in FIG. 18, the system includes a sender device 1802 and a receiver device 1804.

The sender device 1802 is configured to acquire V2X configuration information sent by a plurality of PLMNs and send the V2X configuration information to the receiver device 1804. The V2X configuration information is used for instructing the receiver device to receive a V2X service.

The receiver device 1804 is configured to acquire the V2X configuration information of the plurality of PLMNs and acquire the V2X service according to the V2X configuration information of the plurality of PLMNs.

In an exemplary implementation mode, the sender device 1802 includes at least one of: a public network element, a UE or a V2X control function. The public network element includes at least one of: a V2X AS, a BM-SC, an MBMS-GW, an MME, an MCE and an eNB. The receiver device 1804 may include the UE.

If the sender device 1802 is the UE, the UE may send the acquired V2X configuration information to the eNB and the eNB may broadcast the V2X configuration information to all UEs in a coverage area of the eNB.

An embodiment of the present application further provides a computer-readable medium. In the embodiment, the computer-readable medium may be configured to store program codes for executing the steps described below.

In S11, V2X configuration information sent by a plurality of PLMNs is acquired, where the V2X configuration information is used for instructing a UE to receive a V2X service.

In S12, the V2X configuration information is sent to the UE.

In the embodiment, the computer-readable medium may include, but is not limited to, a USB flash disk, a read-only memory (ROM), a random access memory (RAM), a mobile hard disk, a magnetic disk, an optical disk or another medium capable of storing the program codes.

An embodiment of the present application further provides a computer-readable medium. In the embodiment, the computer-readable medium may be configured to store program codes for executing the steps described below.

In S21, V2X configuration information of a plurality of PLMNs is acquired.

In S22, a V2X service is acquired according to the V2X configuration information of the plurality of PLMNs.

In the embodiment, the computer-readable medium may include, but is not limited to, a USB flash disk, a read-only memory (ROM), a random access memory (RAM), a mobile hard disk, a magnetic disk, an optical disk or another medium capable of storing the program codes.

It will be understood by those skilled in the art that functional modules/units in all or part of the steps of the method, the system and the apparatus disclosed above may be implemented as software, firmware, hardware and appropriate combinations thereof. In the hardware implementation, the division of the functional modules/units mentioned in the above description may not correspond to the division of physical components. For example, one physical component may have several functions, or one function or step may be executed jointly by several physical components. Some or all components may be implemented as software executed by processors such as digital signal processors or microcontrollers, hardware, or integrated circuits such as application specific integrated circuits. Such software may be distributed on a computer-readable medium, which may include a computer storage medium (or a non-transitory medium) and a communication medium (or a transitory medium). As is known to those skilled in the art, the term, computer storage medium, includes volatile and nonvolatile, removable and non-removable medium implemented in any method or technology for storing information (such as computer-readable instructions, data structures, program modules or other data). The computer storage medium includes, but is not limited to, a RAM, a ROM, an EEPROM, a flash memory or other memory technologies, a CD-ROM, a digital versatile disc (DVD) or other optical disc storage, a magnetic cassette, a magnetic tape, a magnetic disk storage or other magnetic storage apparatuses, or any other medium used for storing desired information and accessed by a computer. In addition, as is known to those skilled in the art, the communication medium generally includes computer-readable instructions, data structures, program modules or other data in modulated data signals such as carriers or other transmission mechanisms, and may include any information delivery medium.

The above are only exemplary embodiments of the present application and are not intended to limit the present application, and for those skilled in the art, the present application may have various modifications and variations. Any modifications, equivalent substitutions, improvements and the like made within the spirit and principle of the present application should fall within the scope of the present application.

INDUSTRIAL APPLICABILITY

The embodiments of the present application provide a V2X service configuration method and apparatus, and service acquisition method, apparatus and system. When UE is located within the area where multiple PLMNs provide V2X services, the UE can acquire the V2X services from the PLMNs so that the UE can receive V2X services from different PLMNs in the case where a plurality of operators deploy a plurality of MBMS networks.

What is claimed is:

1. A Vehicle-to-Everything (V2X) service configuration method, comprising:
    acquiring V2X configuration information sent by a plurality of public land mobile networks (PLMNs), wherein the V2X configuration information is used for instructing a user equipment (UE) to receive a V2X service in the plurality of PLMNs and comprises V2X configuration information in a serving PLMN and V2X configuration information in a non-serving PLMN; and
    sending the V2X configuration information to the UE;
    wherein the acquiring V2X configuration information sent by a plurality of PLMNs through one of the following manners:
    acquiring the V2X configuration information through a public network element; or
    acquiring the V2X configuration information pre-configured.

2. The method of claim 1, wherein the plurality of PLMNs are deployed by a plurality of operators in a same area.

3. The method of claim 1, wherein the V2X configuration information comprises:
    multimedia broadcast multicast service (MBMS) control information, wherein the MBMS control information comprises at least one of: a system information block 13 (SIB13), a SIB15, a SIB 20, a multicast control channel (MCCH), a single cell-multicast control channel (SC-MCCH) or multicast scheduling information (MSI).

4. The method of claim 1, wherein the V2X configuration information comprises V2X frequency configuration information in the plurality of PLMNs, wherein the V2X frequency configuration information is used for indicating a deployment frequency identifier of the V2X service.

5. The method of claim 1, wherein the public network element comprises at least one of the following network elements: a Vehicle-to-Everything application server (V2X AS), a broadcast multicast service center (BM-SC), a multimedia broadcast multicast service gateway (MBMS-GW), a mobility management entity (MME), a multi-cell/multicast coordination entity (MCE) and an evolved node B (eNB).

6. A Vehicle-to-Everything (V2X) service acquisition method, comprising:
acquiring, by a user equipment (UE), V2X configuration information of a plurality of public land mobile networks (PLMNs), wherein the V2X configuration information comprises V2X configuration information in a serving PLMN and V2X configuration information in a non-serving PLMN, and the V2X configuration information is pre-configured or is acquired through a public network element; and
acquiring a V2X service according to the V2X configuration information of the plurality of PLMNs.

7. The method of claim 6, wherein the acquiring, by a UE, V2X configuration information of a plurality of PLMNs comprises:
receiving, through a plurality of receivers, the V2X service of the plurality of PLMNs; or
receiving, through a single receiver, the V2X service of the plurality of PLMNs in a time division manner.

8. The method of claim 6, wherein the acquiring, by a UE, V2X configuration information of a plurality of PLMNs comprises:
receiving the V2X configuration information of the plurality of PLMNs sent by a V2X control function.

9. The method of claim 6, wherein the acquiring a V2X service according to the V2X configuration information of the plurality of PLMNs comprises:
searching for the V2X configuration information of a specified V2X service according to a PLMN and a frequency of the specified V2X service indicated by a SIB15 acquired by the UE, and reporting at least one of the frequency and the V2X configuration information to an evolved node B (eNB); and
receiving the V2X service corresponding to the V2X configuration information of the specified V2X service sent by the eNB.

10. The method of claim 6, further comprising:
sending, by the UE, an eNB at least one of: capability indication information for indicating a capability of receiving from more than one PLMN, or V2X service interest indication information.

11. The method of claim 10, wherein the acquiring a V2X service according to the V2X configuration information of the plurality of PLMNs comprises at least one of:
receiving the V2X service of a high priority; and
receiving the V2X service corresponding to the capability indication information, wherein the capability indication information carries one of: a plurality of PLMN identifiers (IDs) or a plurality of frequency identifiers of the plurality of PLMNs from which the UE receives simultaneously.

12. The method of claim 10, wherein the acquiring, by a UE, V2X configuration information of a plurality of PLMNs comprises:
sending a request message to the eNB, wherein the request message carries the V2X service interest indication information used for indicating a PLMN ID of interest to the UE, a frequency of interest of each of the PLMN IDs and a V2X service identifier of interest to the UE; and
acquiring V2X configuration information of a specified PLMN sent by the eNB, wherein the V2X configuration information of the specified PLMN is configuration information of a PLMN which belongs to a different operator from the eNB and is located in a same coverage area with the eNB.

13. A Vehicle-to-Everything (V2X) service configuration apparatus, comprising:
a processor; and
a memory for storing instructions executable by the processor,
wherein the processor is configured to:
acquire V2X configuration information sent by a plurality of public land mobile networks (PLMNs), wherein the V2X configuration information is used for instructing a user equipment (UE) to receive a V2X service and comprises V2X configuration information in a serving PLMN and V2X configuration information in a non-serving PLMN; and
send the V2X configuration information to the UE;
wherein the processor is configured to acquire the V2X configuration information sent by the plurality of PLMNs through one of the following manners:
acquiring the V2X configuration information through a public network element; or
acquiring the V2X configuration information pre-configured.

14. The apparatus of claim 13, wherein the V2X configuration information comprises: multimedia broadcast multicast service (MBMS) control information, wherein the MBMS control information comprises at least one of: a system information block 13 (SIB13), a SIB15, a SIB 20, a multicast control channel (MCCH), a single cell-multicast control channel (SC-MCCH) or multicast scheduling information (MSI),
or, wherein the V2X configuration information comprises V2X frequency configuration information in the plurality of PLMNs, wherein the V2X frequency configuration information is used for indicating a deployment frequency identifier of the V2X service.

15. A Vehicle-to-Everything (V2X) service acquisition apparatus, comprising:
a processor; and
a memory for storing instructions executable by the processor,
wherein the processor is configured to implement the method of claim 6.

16. The apparatus of claim 15, wherein the processor is configured to:
receive, through a plurality of receivers, the V2X service of the plurality of PLMNs; or
receive, through a single receiver, the V2X service of the plurality of PLMNs in a time division manner,
or, wherein the processor is configured to receive the V2X configuration information of the plurality of PLMNs sent by a V2X control function,
or, wherein the processor is configured to:
search for V2X configuration information of a specified V2X service according to a PLMN and a frequency of the specified V2X service indicated by an acquired SIB15;
report at least one of the frequency and the V2X configuration information to an evolved node B (eNB); and
receive the V2X service corresponding to the V2X configuration information of the specified V2X service sent by the eNB.

17. The apparatus of claim 15, wherein the processor is further configured to:
- send an eNB at least one of: capability indication information for indicating a capability of receiving from more than one PLMN, or V2X service interest indication information,
- wherein the processor is configured to perform at least one of followings:
- receiving the V2X service of a high priority; or
- receiving the V2X service corresponding to the capability indication information, wherein the capability indication information carries one of: a plurality of PLMN identifiers (IDs) or a plurality of frequency identifiers of the plurality of PLMNs from which the V2X service is received simultaneously,
- or, wherein the processor is configured to:
- send a request message to the eNB, wherein the request message carries the V2X service interest indication information used for indicating a PLMN ID of interest to a UE, a frequency of interest of each of the PLMN IDs and a V2X service identifier of interest to the UE; and
- acquire V2X configuration information of a specified PLMN sent by the eNB, wherein the V2X configuration information of the specified PLMN is configuration information of a PLMN different from a PLMN of the eNB and is located in a same coverage area with the eNB.

18. The method of claim 1, wherein the V2X configuration information comprises a temporary mobile subscriber identity (TMGI).

* * * * *